July 1, 1930.  W. U. GRIFFITHS  1,769,832
QUICK ACTING VALVE MECHANISM
Filed April 10, 1928
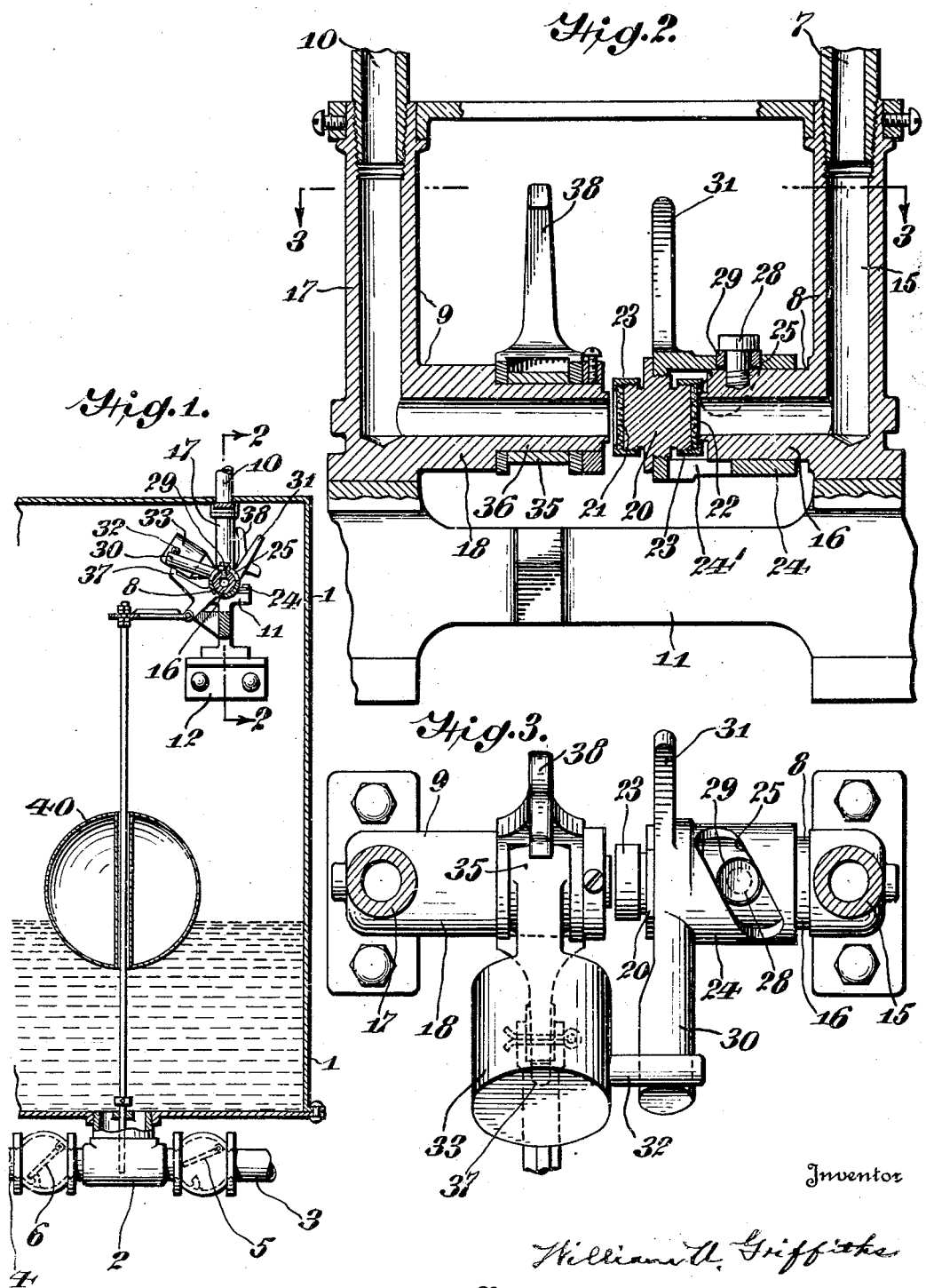

Patented July 1, 1930

1,769,832

UNITED STATES PATENT OFFICE

WILLIAM U. GRIFFITHS, OF PHILADELPHIA, PENNSYLVANIA

QUICK-ACTING VALVE MECHANISM

Application filed April 10, 1928. Serial No. 268,930.

My invention relates to quick acting valve mechanisms and is particularly adapted for use in pressure tanks for automatically controlling the supply of air, steam, or other gaseous fluids under pressure to a tank for the purpose of expelling accumulated water or other liquid therefrom. Such devices are used, for instance, in elevating water from a lower to a higher level, as, for example, the returning of the condensed water in steam heating systems to the boiler of the system. Generally the arrangement is such that when the level of the accumulated liquid reaches a certain height air, steam or other gaseous fluid under pressure is supplied to the tank above the liquid therein to expel the same therefrom, the flow of the gaseous fluid under pressure into the tank being interrupted when the liquid level drops a predetermined distance. At such moment the tank is vented in one way or another and the gas therein allowed to escape to permit more liquid, for example, water, to accumulate. The flow of gaseous fluid under pressure into and out of the container or tank is controlled by quick-acting valve mechanism, and it is that mechanism to which my invention relates.

One of the objects of my invention is to provide a mechanism of the character indicated, wherein the moving parts are so constructed and arranged that friction is reduced to a minimum, to thereby increase the efficiency of the said mechanism.

A more specific object of the invention is to provide means of the character indicated comprising a valve carrying and actuating member which is adapted to perform its function more quickly and promptly than has been possible heretofore in the devices of this character of which I am aware.

Other objects and advantages of the invention will be set forth in detail in the following description or will be apparent from such description.

In order to more fully comprehend my invention reference should be had to the accompanying drawing, in which I have illustrated a convenient embodiment of the same. However, it is to be expressly understood that the invention is susceptible of embodiment in other forms of construction than that shown and that changes in the details of construction may be made within the scope of the claim without departing from the said invention.

In the drawing:

Fig. 1 is a longitudinal vertical sectional view of an apparatus provided with valve actuating means embodying my invention, certain parts of the structure being shown in elevation;

Fig. 2 is an enlarged view in longitudinal vertical section of the valve mechanism embodying the invention, taken on the line 2—2 of Fig. 1; and Fig. 3 is a view taken in a horizontal plane along the line 3—3 of Fig. 1 and showing the mechanism embodying the invention in top plan.

For the purpose of indicating more fully the invention and its practical characteristics I have shown the same as embodied in the valve mechanism of a pressure tank structure, wherein it is employed to control the admission of air, steam, or other gas into a tank under pressure, and also to vent the tank at proper times or moments for the purpose of releasing the gaseous fluid from the tank and permitting liquid, for example, water to re-enter the tank.

In the said drawing I have shown a tank 1 of known construction, having a T-coupling 2 connected thereto, to which coupling inlet and outlet pipes 3 and 4 are connected, the latter being provided respectively with check valves 5 and 6 which operate in known manner.

When a predetermined amount of water has accumulated in the tank 1 air, steam, or gaseous fluid under pressure, is admitted from a pipe 7 through a passageway provided in the member 8. The entry of the gaseous fluid under pressure into the tank expels the water therefrom in known manner. When the expulsion of the water from the tank has been completed the gaseous fluid under pressure in the tank escapes therefrom through a passageway provided in the member 9 and is conducted from said passageway through a pipe 10. The members 8 and 9 are supported on a supporting base 11 which in turn is supported upon brackets 12, only one of which is shown, mounted in the tank 1 upon the side wall thereof in oppositely disposed relation to each other. The member 8 comprises portions 15 and 16 angularly related to each other, as shown, and the member 9 likewise includes portions 17 and 18 angularly related to each other, as shown. The portions 16 and 18 of these members extend in horizontal directions toward each other and transversely of the tank 1. They are positioned in alinement with each other, as is shown in Figs. 2 and 3 of the drawing. A valve body 20 is located between the opposing ends of the portions 16 and 18. The opposite ends of the said valve body are provided with facings of suitable material 21 and 22, relatively soft as compared with the material of the valve body 20. These portions 21 and 22 are secured and held in position upon the opposed ends of the valve body by means of flanged caps 23. The valve body is supported in an opening in the inner end of a sleeve member 24 which is rotatably mounted upon the member 16. The sleeve member 24 is provided with an opening 24' in its side, as shown in Fig. 2 of the drawing, to permit the passage of air, steam or other gas from the passageway through the member 8, such air, steam or other gas being supplied from the pipe 7. The sleeve member 24 is provided with a slot 25 which extends transversely thereof and in a plane forming an obtuse angle with the axis thereof. In other words, the slot 25 extends in inclined relation to the length of the sleeve 24. A headed screw 28 is mounted upon and projects upwardly from the portion 16 through the slot 25. An anti-friction roller 29 is mounted upon the screw 28 and is retained in position within the slot 25 by means of the head of the said screw. In view of the presence of the headed screw 28 in the slot 25 it will be apparent that upon rotation of the sleeve 24 the latter is caused to move axially upon the said member 16 in one direction or the other, depending upon the direction of rotation. For the purpose of effecting oscillatory movements of the sleeve 24 during the operation of the system I have provided the said sleeve with angularly related projections 30 and 31 with the inner edges of which an arm 32 which projects laterally from an actuating weight 33, is adapted to contact alternately. The weight 33 is provided at its inner end with a circular sleeve portion 35 which is mounted upon a reduced portion 36 of the portion 18 of the part 9. For the purpose of actuating the weight 33 to cause pivotal movements thereof alternately in opposite directions I have provided an actuating member comprising the angularly related arms 37 and 38, which member also is pivoted upon the reduced portion 36. The weight is located in the angle between the parts 37 and 38. Consequently when the member comprising the arms 37 and 38 is actuated one or the other of said arms 37 and 38 contacts with the weight to cause pivotal movement thereof in one direction or the other. When so moved the arm 32 which projects laterally from the weight contacts with one or the other of the arms 30 or 31 to cause pivotal movement of the sleeve 24. The pivotal movement of the actuating member comprising the arms 37 and 38 is effected by means of a float 40 which moves upwardly and downwardly with the upward and receding movements of the water in the tank 1.

It will be assumed that in Fig. 1 the valve is shown in condition with the water entering the tank 1, the float 40 being at such time moving upwardly. When the float 40 finally arrives at its uppermost position it operates to cause pivotal movement of the actuating member comprising the arms 37 and 38 in a clockwise direction (having reference to Fig. 1), and when so moved the sleeve 24 with the valve body 20 carried thereby is rotated and simultaneously moved in a direction to cause the disc or facing 22 to be seated upon the inner end of the tubular portion 18 and close the passageway through the member 9. Simultaneously the disc or facing 21 is moved out of engagement with the adjoining inner end of the portion 16, in consequence of which the air or other gas is admitted into the tank through the passageway provided in the member 8. The admission of the air or other gas under pressure into the tank expels the accumulated water therefrom. Upon the completion of such expulsion and the arrival of the float 40 at or near the bottom of the tank 1, the valve is again actuated to close the passageway through the member 8 and to open the passageway through the member 9. When the valve occupies that position water is again permitted to accumulate in the tank 1 to move the float upwardly whereupon the operation previously described is repeated.

The presence of the anti-friction roller 29 upon the headed screw 28 which is adapted to make rolling contact with the opposite edges of the slot 25 reduces the wear of the edges of the said slot and also facilitates the oscillatory movements of the sleeve 24, which results in axial or lengthwise movements thereof and of the valve body 20 carried thereby to move the facings 21 and 22 alternately into open and closed positions with respect to the inner ends of the portions 18 and 16 of the members 9 and 8 respectively.

Having thus described my invention, what I claim and desire to secure by Letters Patent is:

In a device of the character described which is adapted to control the admission and emission of a gaseous fluid under pressure to and from a pressure tank, comprising tubular members leading into and from the said tank, the inner ends of which are located in spaced alined relation to each other inside the tank, a tubular member rotatably mounted upon the inner end portion of one of the first named tubular members, said rotatable tubular member being provided with a slot therein which extends in inclined angular relation with respect to the axis thereof, a valve body supported upon the outer end of said rotatable tubular member and having valve faces on the opposite ends thereof, the said valve body being located between the inner ends of the first named tubular members the said rotatable tubular member having an opening in the bottom thereof for permitting fluid to flow therethrough, a projection upon the inner end portion of the tubular member upon which the said rotatable tubular member is mounted, which projection extends through the said slot, a roller mounted upon said projection and adapted to engage the opposite edges of said slot, and means for effecting oscillatory movements of the said rotatable tubular member.

In testimony that I claim the foregoing as my invention I have hereunto signed my name this 6th day of April, 1928.

WILLIAM U. GRIFFITHS.